United States Patent
Dunlop et al.

[11] Patent Number: 5,912,733
[45] Date of Patent: Jun. 15, 1999

[54] LASER PLUMB LINE

[76] Inventors: Ronald Dunlop, 4862 Culloden Street, Vancouver, British Columbia, Canada, V5V 4X9; Bradley Dunlop, 170 Jupiter Court, Kelowna, British Columbia, Canada, V1X 5W5; Carol Milligan, 2953 Springfield Road, Kelowna, British Columbia, Canada, V1X 4N5

[21] Appl. No.: 09/186,483

[22] Filed: Nov. 5, 1998

Related U.S. Application Data

[60] Provisional application No. 60/064,344, Nov. 5, 1997.

[51] Int. Cl.$^6$ ........................................ G01C 9/12
[52] U.S. Cl. .............................. 356/250; 33/227; 33/286
[58] Field of Search ....................... 356/138, 149, 356/248, 250; 33/227, 286, DIG. 21, 365, 263, 281, 282, 283, 285, 374, 375, 384, 388, 389

[56] References Cited

U.S. PATENT DOCUMENTS

| | | | |
|---|---|---|---|
| 3,044,173 | 7/1962 | O'Neal et al. | 33/46 |
| 3,354,549 | 11/1967 | Fisher | 33/74 |
| 3,505,739 | 4/1970 | Abrams | 33/189 |
| 5,531,031 | 7/1996 | Green | 33/365 |
| 5,537,205 | 7/1996 | Costa et al. | 356/250 |

*Primary Examiner*—Frank G. Font
*Assistant Examiner*—Michael P. Stafira
*Attorney, Agent, or Firm*—Antony C. Edwards

[57] ABSTRACT

A laser is pivotally concentrically mounted in a gimballed mounting structure having outer and inner pivotally mounted concentric rings. An angle indicator is mounted to said outer ring so as to be viewable by a user and cooperates with said inner ring to as to indicate to said user an angle of inclination of said gimballed mounting structure when lowermost ends of said legs are placed on a solid surface. A generally elongate linearly calibrated gauge is mounted to a base between said legs of the structure so as to extend between said legs beneath a lowermost end of said laser. The gauge is graduated so that a first angle gradation, may be aligned with a mark to be transposed on said solid surface. With said gauge aligned generally perpendicularly to a line of constant elevation on said solid surface if said solid surface is sloped, and with said mark to be transposed aligned with said first angle gradation on said gauge and with said first angle gradation corresponding to said angle of inclination indicated by said angle indicator, said lowermost end of said laser housing may be manually grasped by said use to rapidly damp and cease oscillatory swinging of said laser housing about said first axis of rotation, so as to rapidly indicate an overhead illuminated mark on an overhead surface where said light beam intersects said overhead surface, thereby vertically transposing said mark to be transposed.

3 Claims, 8 Drawing Sheets

LASER PLUMB LINE

CROSS REFERENCE TO RELATED APPLICATION

This application claims priority from United States Provisional Patent application Ser. No. 60/064,344 filed Nov. 5, 1997 titled Laser Plumb Line.

FIELD OF THE INVENTION

This invention relates to the field of self-centering gimbal-mounted laser plumb assemblies.

BACKGROUND OF THE INVENTION

In the trades, such as the electrical trade, it is well known to use portable lasers where is it desired to extend a straight line over a significant distance, for example, for levelling, surveying or the like. It is also known to incorporate a laser into a self-centering plumb assembly such as described in U.S. Pat. No. 5,537,205 which issued to Costa 'et al' on Jul. 16, 1996 for a Self Leveling Laser Plumb Assembly. Applicant is also aware of other optical plumb lines such as those disclosed in the following U.S. Pat. Nos. 3,858,984; 3,911,588; 4,183,667; 4,448,528; and 5,163,229.

Like the Costa reference, the laser plumb line of the present invention is directed to replacing manual plumb lines. Manually operated plumb lines are typically a length of string having a weighted plumb bob at one end. In the present invention, a universal joint or two-degree-of-freedom gimbal mounted laser has a weight at its lowermost end so that gravity aligns the laser vertically upwards no matter the inclination on which the base is mounted.

SUMMARY OF THE INVENTION

In summary, the laser plumb line of the present invention includes a laser housing pivotally mounted in a gimballed mounting structure. The gimballed mounting structure has first and second concentric rings. The first ring is an outer ring. The second ring is an inner ring. A first pair of opposed shafts in a first annular space between the first and second rings pivotally mounts the first ring to the second ring. A second pair of opposed shafts in a second annular space between the second ring and the laser housing pivotally mounts the laser housing to the second ring. The first and second pairs of opposed shafts define respectively, first and second perpendicular axes of rotation. The laser housing is concentrically innermost. The first and second perpendicular axes of rotation intersect on an optical axis of a laser mounted in the laser housing.

Legs of generally equal length, which may form a tripod, are mountable to the first ring. They may be mounted in generally equally radially spaced apart relation about an axis of radial symmetry of the first ring. Axes of radial symmetry of the first and second rings and the optical axis intersect at the intersection of the first and second perpendicular axes, and are co-linear when the first and second concentric rings are co-planar and the optical axis is perpendicular to the first and second concentric rings.

The laser housing may be elongate and depend downwardly from the second ring so that a light beam generated by the laser extends along the optical axis of the laser. The laser housing is advantageously weighted below the first axis of rotation so as to urge the laser housing and the optical axis into a vertical orientation.

An angle indicator is mounted to the first ring so as to be viewable by a user. It and cooperates with the second ring so as to indicate to the user an angle of inclination of the gimballed mounting structure when lowermost ends of the legs are placed on a solid surface. A generally elongate linearly calibrated gauge is mounted to a base structure between the legs so as to extend between the legs parallel to the second axis of rotation. The gauge may extend in a plane generally parallel to a plane containing the lowermost ends of the legs. The gauge extends beneath a lowermost end of the laser housing.

The calibrated gauge is graduated so that a first angle gradation, of a calibrated array of angle gradations along said gauge, may be aligned with a mark to be transposed on said solid surface. With the elongate gauge aligned generally perpendicularly to a line of constant elevation on the solid surface if the solid surface is sloped, and with the mark to be transposed aligned with the first angle gradation on the gauge and the first angle gradation corresponding to the angle of inclination indicated by the angle indicator, the lowermost end of the laser housing may be manually grasped by the user to rapidly damp and cease oscillatory swinging of the laser housing about the first axis of rotation, so as to rapidly indicate an overhead illuminated mark on an overhead surface where the light beam intersects the overhead surface, thereby vertically transposing the mark to be transposed.

In an alternative embodiment, a pointer is mounted to the lowermost end of the laser housing so as to extend downwardly, co-linear with the optical axis, to cooperate with the calibrated gauge to indicate the angle of inclination.

Advantageously, the calibrated gauge comprises a pair of parallel spaced apart elongate members having the array of angle gradations along at least one member of the pair of members.

DETAILED DESCRIPTION OF THE PREFERRED EMBODIMENT

As may be seen in the accompanying Figures, a tripod supports a gimbal mount. The gimbal mount consists of two concentric rings pivotally mounted to each other in the annular space between adjacent rings. A laser housing is pivotally mounted concentrically in the inner ring. The rings and laser housing are pivotally mounted by means of two pairs of opposed pins, shafts or the like. The two pairs of pins, in the annular spaces between the concentric rings and housing are radially spaced 90° apart from each other to allow pendulum-like gimballed movement of the laser housing in two degrees of freedom. The laser housing may be cylindrical, such as provided by a length of aluminum tubing, and is mounted in the centre of the smallest ring in the gimbal mount and contains the laser. A series of D-cell batteries, or other appropriate batteries, are contained within the lowermost portion of the cylindrical housing. The batteries act as a power supply for the laser, which may be a small diode laser aligned with its optical axis, that is, the axis of the light beam generated by the laser, longitudinally along the cylindrical housing so as to direct a laser beam upwardly along the longitudinal axis of the cylindrical housing. The batteries act as a plumb bob-like weight to orient the laser beam vertically upwards. An additional hang weight may be provided below the cylindrical housing to assist in quickly aligning the laser beam vertically upwards.

In use, by way of example, if an electrician wishes to install a ceiling fixture, rather than having to measure a distance out along the ceiling while standing on a ladder, the distance may first be measured out along the floor beneath the ceiling. The laser plumb line may then be used to mark the point on the ceiling corresponding to the measured point on the floor so that exact placement of the ceiling fixture is facilitated. Obviously, other trades that are associated with construction may usefully employ the laser plumb line of the present invention for accurate measured placement of fixtures or points of reference which are often difficult to exactly place.

The laser beam transposes a point on the floor or surface level to a point on the ceiling or overhead level. Instead of using a laser, the same concept can also be used with infra-red or acoustic radiation. The cylindrical housing also serves as the plumb mount, and attaches to the innermost ring using levelling screws. The levelling screws allow for calibration of the laser. The tri-pod may have stationary or folding style legs.

Figure 1:
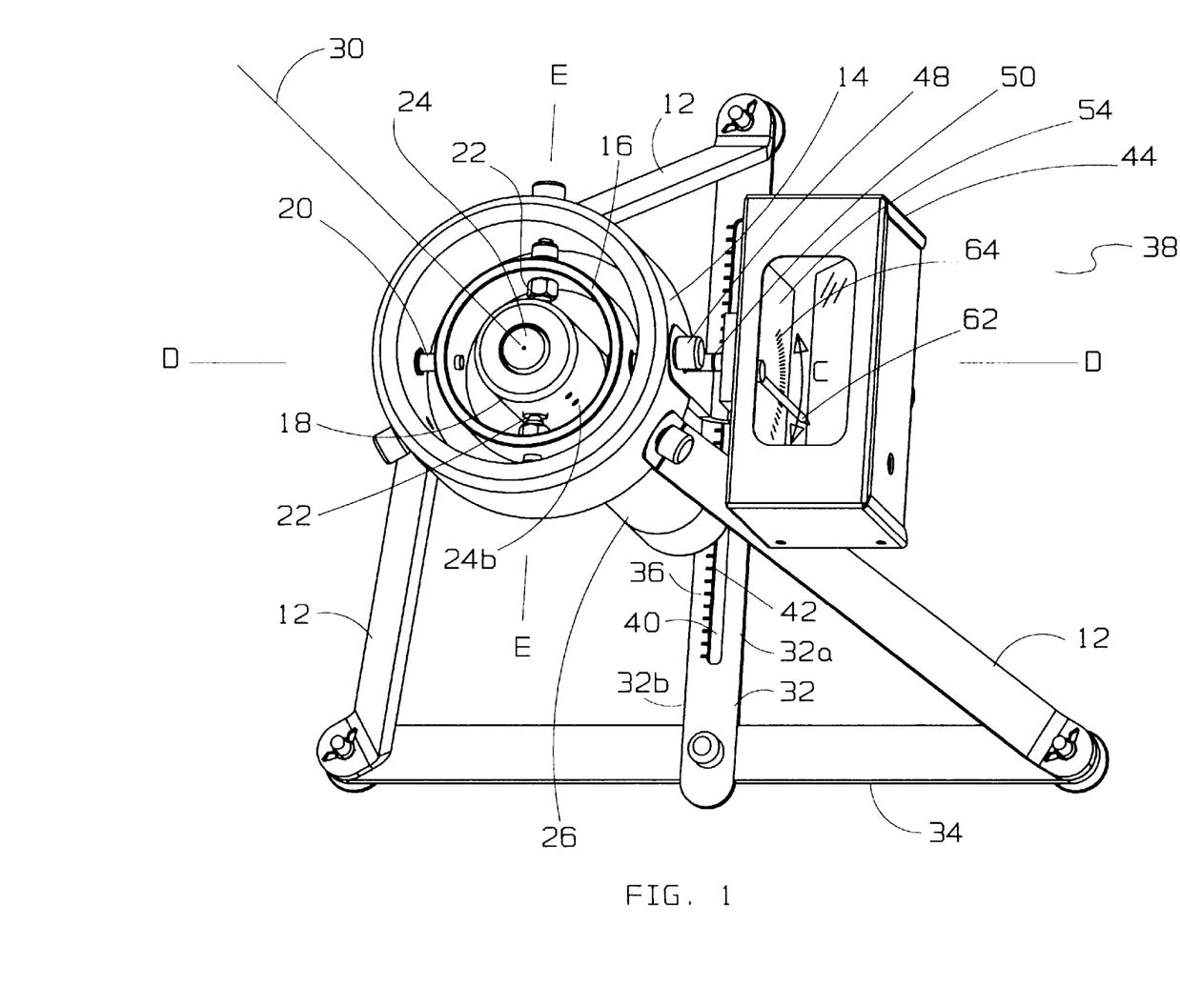
FIG. 1 is, in right side perspective view, the laser plumb line assembly of the present invention.
Figure 2:
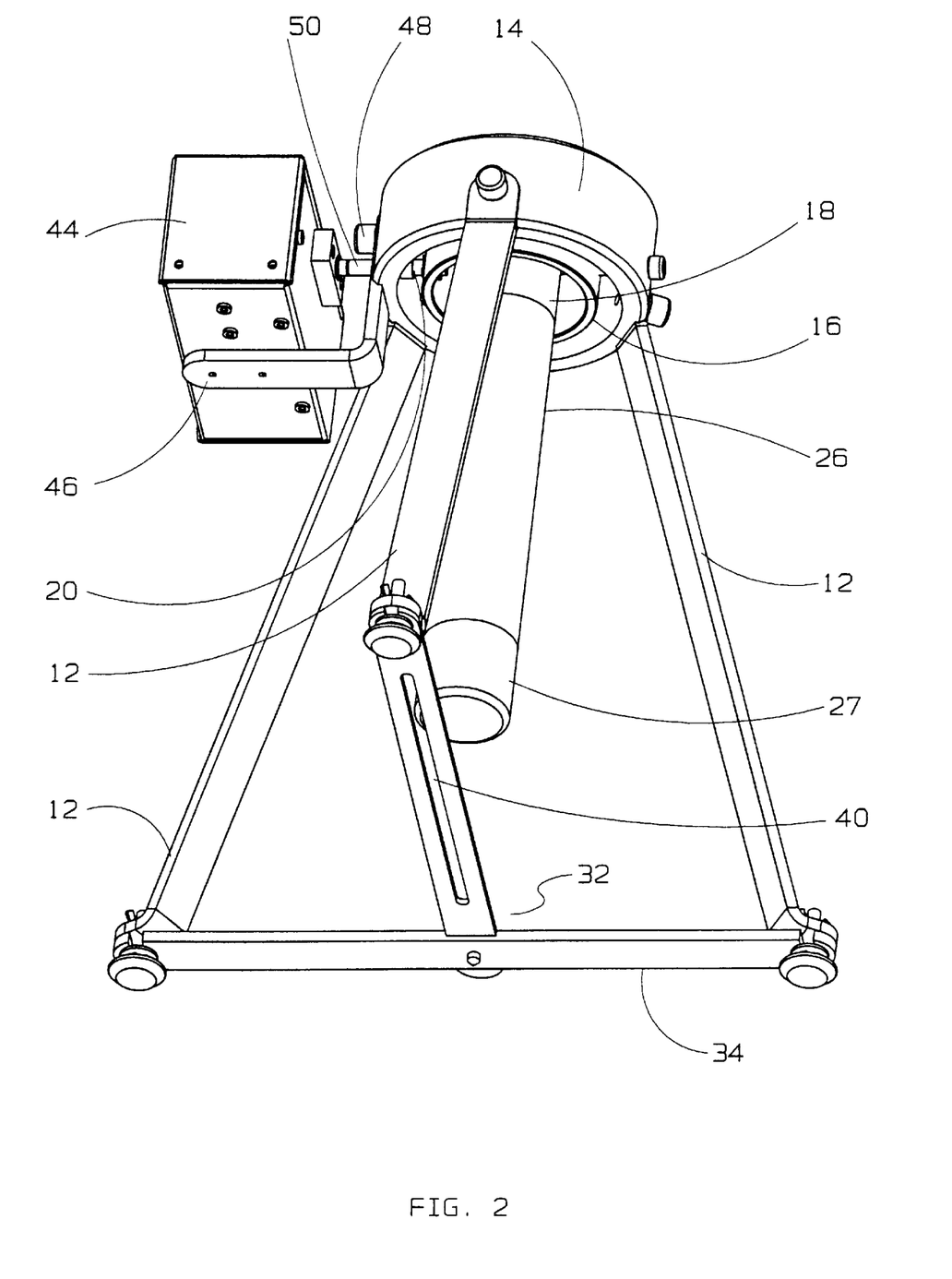
FIG. 2 is, in bottom perspective view, the laser plumb line assembly of FIG. 1.
Figure 3:
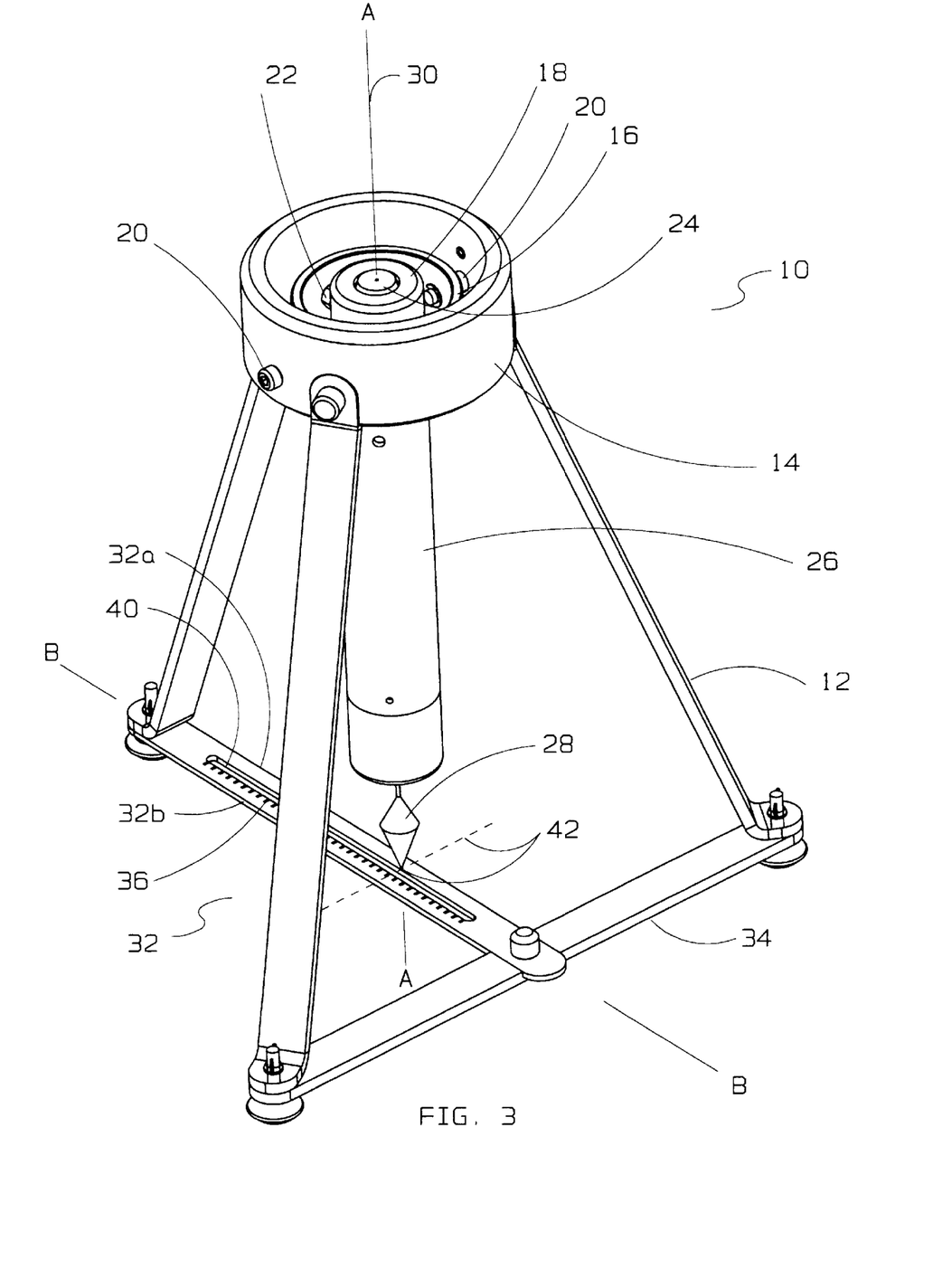
FIG. 3 is, in left side perspective view, the laser plumb line assembly of the present invention in an alternative embodiment.
Figure 4:
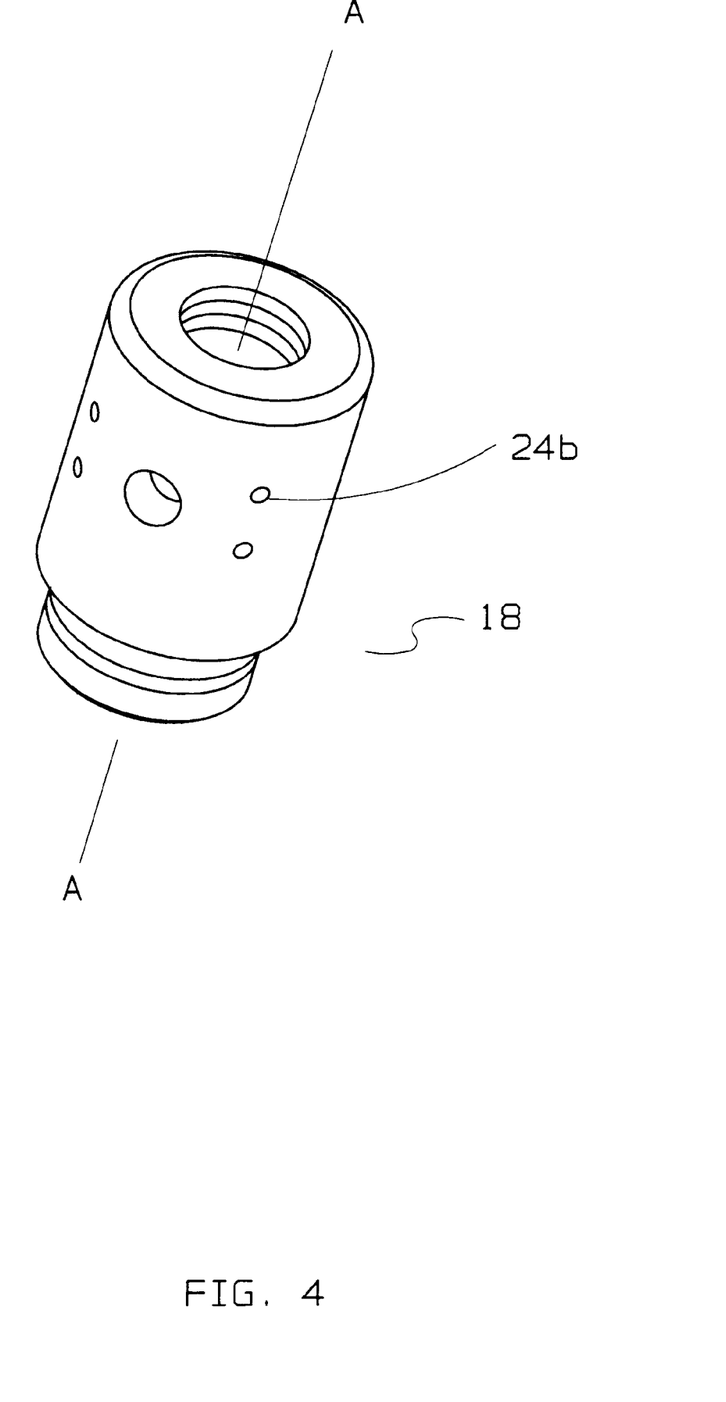
FIG. 4 is, in perspective view, the laser diode head of the laser plumb line assembly of the present invention.

As seen in FIGS. 1–3, the gimballed mounting structure 10 includes tripod legs 12 supporting at their uppermost ends three gimballed concentrically mounted structures, namely, outer ring 14, intermediate ring 16 and, innermost, laser diode head 18, better seen in FIG. 4.

The uppermost ends of the tripod legs are rigidly mounted to the outer surface of outer ring 14. Intermediate ring 16 is supported within outer ring 14 by means of a pair of coaxial pins 20. Laser diode head 18 is concentrically supported within intermediate ring 16 by means of a second pair of coaxial pins 22. Coaxial pins 20 and coaxial pins 22 are co-planar and perpendicular to each other and define axes of rotation D and E respectively.

Figure 5:
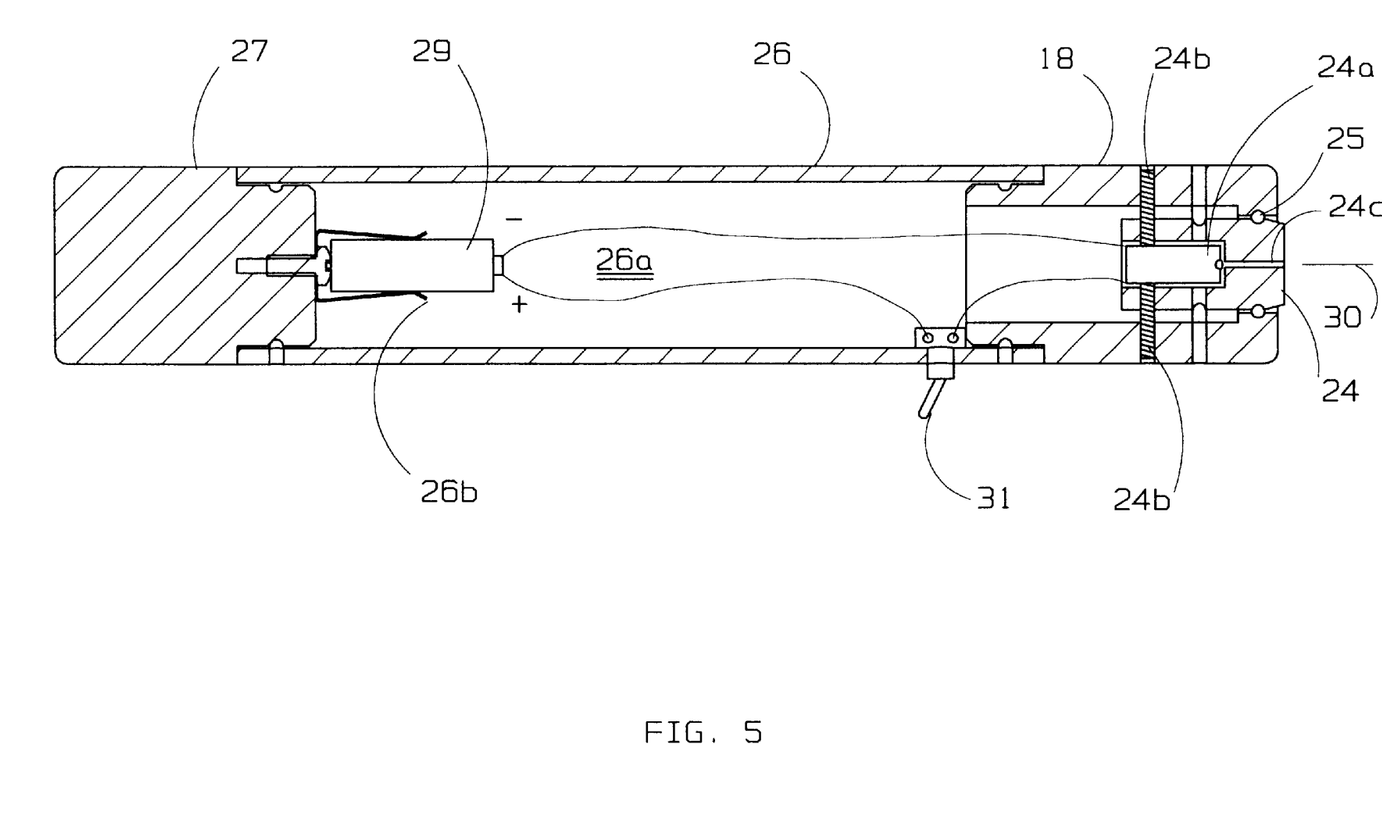
FIG. 5 is a cross sectional view through the cylindrical housing and laser diode head of FIG. 1.

Mounted within laser diode head 18 is laser diode 24a in laser barrel 24, better seen in FIG. 5. Laser diode 24a may be of a commercially available type, such as the 650 nm (red light), 3 milli-watt laser diodes manufactured by Sony™, Hitachi™, and Toshiba™. Alignment of light beam 30 is calibrated by means of calibrations screws 24b. The calibration screws, and the use of O-ring 25, allow the angular orientation of barrel 24 to be adjusted relative to head 18 which is important because the commercially available laser diodes are manufactured with unpredictable alignment of the light beam relative to the cylindrical diode casing. The calibration screws have allowed adjustment by applicants for precision of ¼ inch over 40 feet, assisted by the collimating effect of the elongate cylindrical aperture 24c through which light beam 30 passes before leaving barrel 24.

Mounted to the lower end of laser diode head 18 is cylindrical housing 26 and an optional weighted end 27. Also seen in cross-section in FIG. 5, cylindrical housing 26 extends downwardly from laser diode head 18 and is weighted towards its lowermost end by either or both of internal batteries 29 (such as the 9 volt battery illustrated) used to power laser diode 24, mountable into cylindrical cavity 26a, and an optional weighted end 27. The batteries may be resiliently held in place by spring plate 26b or the like. Toggle switch 31 allows the circuit to be turned on and off. Pointer 28 seen in FIG. 3, may in an alternative embodiment by rigidly mounted to the lowermost end of the cylindrical housing or weighted end so as to extend downwardly therefrom coaxially with the optical axis A corresponding to light beam 30 emanating from laser diode 24a.

Figure 6:
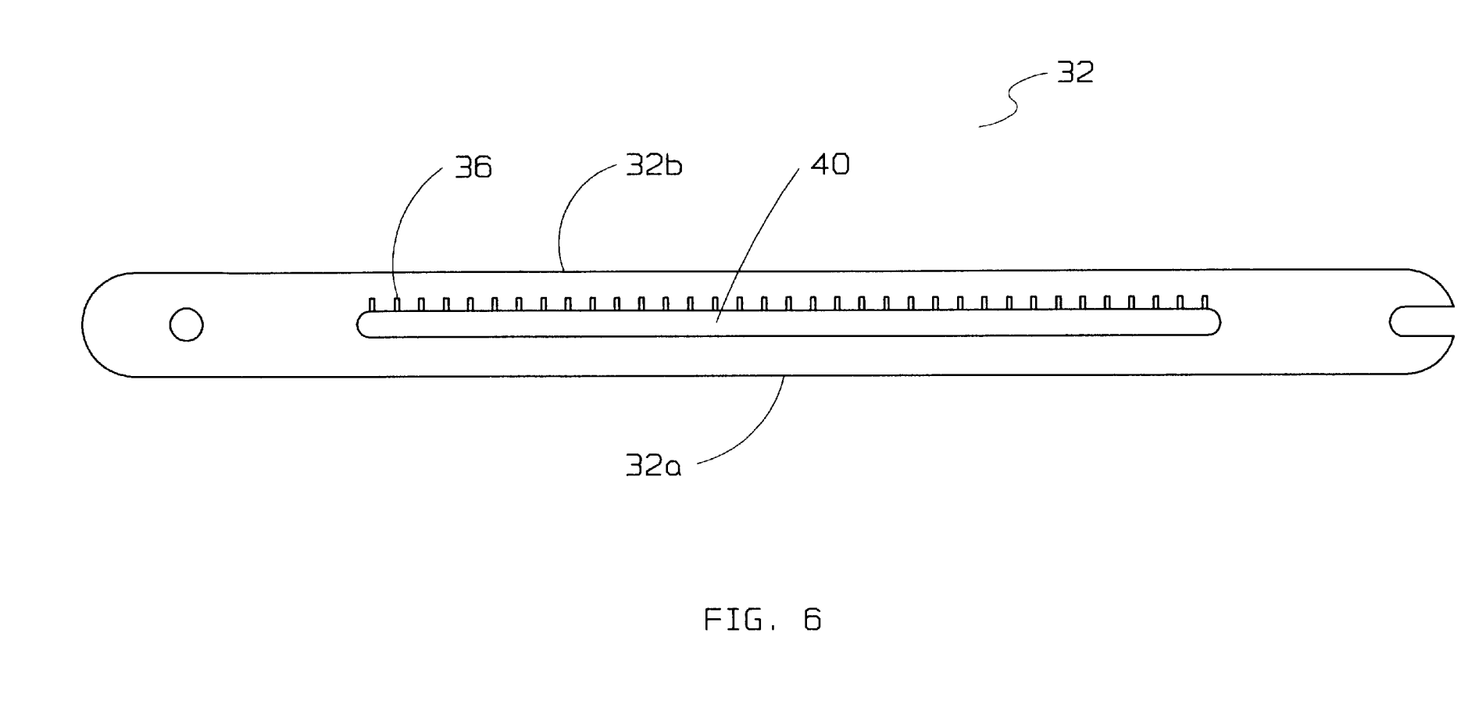
FIG. 6 is, in plan view, the calibrated gauge of the laser plumb line assembly of FIG. 1.
Figure 7:
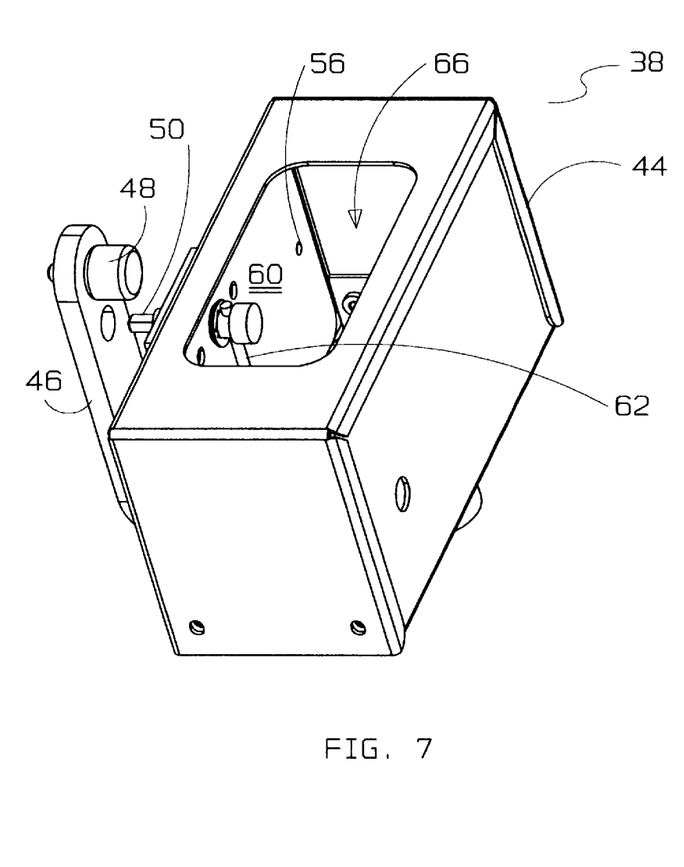
FIG. 7 is, in perspective view, the angle indicator of the laser plumb line assembly of the present invention.
Figure 8:
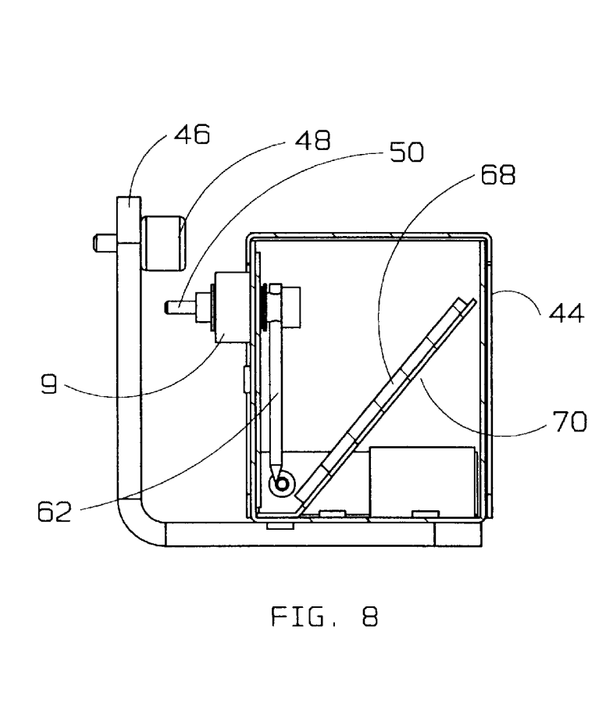
FIG. 8 is a cross sectional view of the angle indicator of FIG. 7.
Figure 9:
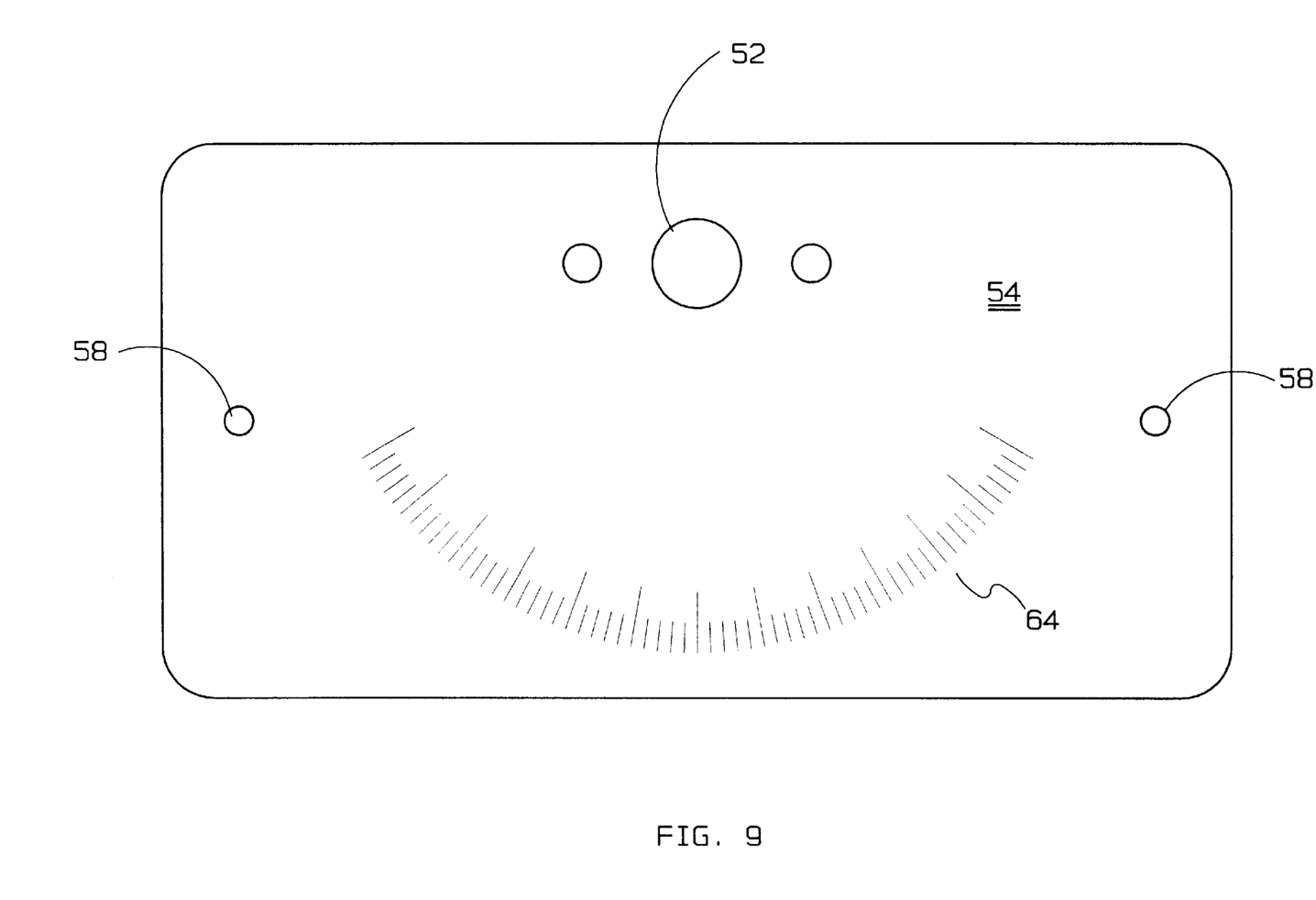
FIG. 9 is, in elevation view, the protractor plate of the angle indicator of FIG. 7.

If pointer 28 is employed, the lowermost end of pointer 28 lies adjacent a linear or slightly concave calibrated gauge 32 better seen in FIG. 6. In all embodiments, calibrated gauge 32 includes a single calibrated elongate member or a pair of parallel spaced apart members 32a and 32b. Gauge 32 is rigidly mounted at one end to one of legs 12 of the tripod and rigidly mounted at its opposite end to a supporting structure such as cross member 34. One or both of members 32a and 32b of calibrated gauge 32 have external degree markings or gradations 36. A supplementary angle indicator 38, better seen in FIGS. 7–9, is mounted to the outer surface of outer ring 14 so as to be readily viewable by a user when viewing degree markings 36 as better described below.

In operation, when it is desired to use the gimballed laser plumb line of the present invention on a sloped surface, as for example, on a ramp, the longitudinal axis B of the slot 40 formed between members 32a and 32b is oriented generally perpendicularly to an approximate line of constant elevation of the inclined surface. Thus aligned, and with the tripod legs resting on the inclined surface, angle indicator 38 indicates the angle of inclination of mounting structure 10 in a first plane containing the longitudinal axis A, light beam 30 and longitudinal axis B. A measured mark 42 is then aligned within slot 40 adjacent the degree markings corresponding to the angle indicated by angle indicator 38.

Thus, for example, if angle indicator 38 shows that the gimballed mounting structure 10 is inclined at an angle of 10 degrees, then measured mark 42 is placed within slot 40 and mounting structure 10 slid over the inclined surface until measured mark 42 is adjacent the 10 degree mark along degree markings 36. If allowed to swing freely, cylindrical housing 26, and pointer 28 in the alternative embodiment, will come to rest so that their lowermost ends point to measured mark 42 at, in this example, the 10 degree marking along degree markings 36. However, because the accurate placement of the gimballed mounting structure 10 is known by use of angle indicator 38, it is not necessary to wait for the damping of the gimballed oscillatory motion of cylindrical housing 26 (and pointer 28) to confirm the correct placement. Instead, housing 26 may be grasped and swung to point to measured mark 42. Light beam 30 thereby with one quick procedure has been aligned accurately with measured mark 42 on an inclined surface so as to transfer or transpose measured mark 42 to a corresponding illuminated point 44 on an overhead surface such as a ceiling.

The above procedure replaces the trial and error method for use of prior art lasered plumb line devices on an inclined surface where, because of the inclined surface, it was hit-and-miss whether the equivalent of pointer 28 would be properly aligned with measured mark 42 when gimballed mounting structure 10 was placed approximately into the correct position on the inclined surface. Each approximate placement would have to be confirmed by waiting for damping of the gimballed oscillatory motion of the pointer. Typically at least several adjustments in the position of the gimballed mounting structure were required, each with its corresponding wait until the pointer was approximately aligned with the measured mark on the inclined surface.

Angle indicator 38 in one embodiment may be a generally rectangular housing 44 rigidly mounted for example by means of bracket 46 to outer ring 14 by means of bolt 48. A shaft 50 extends perpendicularly to the first plane through outer ring 14, coaxially with pins 20. Shaft 50 may be an extension of one of pins 20 and free to rotate so that rotation of shaft 50 corresponds with the rotation of intermediate ring 16. The distal end of shaft 50 extends into housing 44 through aperture 52 in protractor plate 54. Protractor plate 54 is rigidly mounted for example by means of bolts or screws 56 through corresponding apertures 58 to inner wall 60 of housing 44 adjacent outer ring 14. Pointer 62 is rigidly perpendicular mounted to the distal end of shaft 50 so as to extend downwardly into housing 44. Thus, as intermediate ring 16 rotates about pins 20 relative to outer ring 14, pointer 62 rotates in direction C by a corresponding radial arc as measured by angular gradations 64 on protractor plate 54. A user looking through viewport 66 on housing 44 will see a reflection of pointer 62 and angular gradation 64 reflected in inclined mirror 68 mounted for example at 45 degrees within housing 44. The mirror image of the angular numbers corresponding to angular gradation 64 are printed on protractor plate 54 so as to appear legible when viewed as a reflected image in inclined mirror 68. Viewport 66 may advantageously be covered by means of a glass window or the like so as to keep the interior of housing 44 dust and dirt free. Inclined mirror 68 may be mounted on an inclined rigid bracket 70.

Once again, in operation, the base of mounting structure 10 is placed so as to position the slot 40 in gauge 32 over the desired mark 42 to be plumbed. The angle indicated within angle indicator 38 is then checked and read. The frame is then moved so as to place the mark 42 beside the corresponding degree marking 36 on gauge 32. Consequently, it may be seen that a pointer 28 is not required when using angle indicator 38 and that it is no longer required to wait for damping out of gimballed oscillations of the gimbal-mounted laser housing.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A laser plumb line comprising:

a laser housing pivotally mounted in a gimballed mounting structure, said gimballed mounting structure having first and second concentric rings, a first pair of opposed shafts in a first annular space between said first and second rings for pivotally mounting said first ring to said second ring, a second pair of opposed shafts in a second annular space between said second ring and said laser housing for pivotally mounting said laser housing to said second ring, said first and second pairs of opposed shafts defining respectively, first and second perpendicular axes of rotation, said first ring an outermost ring of said first and second concentric rings, said laser housing concentrically innermost, said first and second perpendicular axes of rotation intersecting on an optical axis of a laser mounted in said laser housing, legs of generally equal length mountable to said first ring, axes of radial symmetry of said first and second rings and said optical axis intersecting at said intersection of said first and second perpendicular axes, and co-linear when said first and second concentric rings are co-planar and said optical axis is perpendicular to said first and second concentric rings, said laser housing elongate and depending downwardly from said second ring so that a light beam generated by said laser extends along said optical axis of said laser, said laser housing weighted below said first axis of rotation so as to urge said laser housing and said optical axis into a vertical orientation, an angle indicator mounted to said first ring so as to be viewable by a user and cooperating with said second ring so as to indicate to said user an angle of inclination of said gimballed mounting structure when lowermost ends of said legs are placed on a solid surface, a generally elongate linearly calibrated gauge mounted to a base structure between said legs so as to extend between said legs parallel to said second axis of rotation, beneath a lowermost end of said laser housing, wherein said calibrated gauge is graduated so that a first angle gradation, of a calibrated array of angle gradations along said gauge, may be aligned with a mark to be transposed on said solid surface, wherein, with said elongate gauge aligned generally perpendicularly to a line of constant elevation on said solid surface if said solid surface is sloped, and with said mark to be transposed aligned with said first angle gradation on said gauge and said first angle gradation corresponding to said angle of inclination indicated by said angle indicator, said lowermost end of said laser housing may be manually grasped by said user to rapidly damp and cease oscillatory swinging of said laser housing about said first axis of rotation, so as to rapidly indicate an overhead illuminated mark on an overhead surface where said light beam intersects said overhead surface, thereby vertically transposing said mark to be transposed.

2. The laser plumb line of claim 1 wherein a pointer is mounted to said lowermost end of said laser housing so as to extend downwardly, co-linear with said optical axis, to cooperate with said calibrated gauge to indicate said angle of inclination.

3. The laser plumb line of claim 1 wherein said calibrated gauge comprises a pair of parallel spaced apart elongate members having said array of angle gradations along at least one member of said pair of parallel spaced apart elongate members.

\* \* \* \* \*